Nov. 19, 1946.   W. P. WELCH   2,411,401

ACCELEROMETER

Filed July 28, 1942

WITNESSES:

INVENTOR
William P. Welch.
BY
ATTORNEY

Patented Nov. 19, 1946

2,411,401

UNITED STATES PATENT OFFICE 2,411,401

ACCELEROMETER

William P. Welch, Arlington, Va., assignor to Westinghouse Electric Corporation, East Pittsburgh, Pa., a corporation of Pennsylvania Application July 28, 1942, Serial No. 452,576

4 Claims. (Cl. 171—209)

This invention relates to a device for use in determining the characteristics of motion imparted to a body upon being subjected to a shocking force.

The possibility of failure of apparatus when it is subjected to an instantaneous or rapidly applied force in the nature of a shock is well known. Apparatus which is apt to be subjected to shocking forces in this manner is frequently tested for its ability to stand up under shock prior to being placed in actual use. To the best of my knowledge, no device has been heretofore devised which will indicate or measure the motion which is imparted to a body upon being subjected to a shocking force. Obviously, an instrument that will measure the motion of a body subjected to shock is desirable in that it will provide an aid in determining the nature of a shock and explaining why apparatus breaks when shocked.

One of the principal objects of this invention is to provide a device for producing a measurable impulse proportional to the movement of a body subjected to a shocking force.

A further object of this invention is to provide a device which may be readily attached to a body to be subjected to a shocking force, and which will generate an electrical impulse proportional to the movement of the body in response to a shock from which the frequency and acceleration of movement of the body may be determined.

A further object is to provide a device for detecting the movement of a body under a shock force.

A further object is to provide a device for rigid attachment to a body to be subjected to shock with charge generating means comprising a piezo-electric quartz crystal which will generate an impulse in response to movement of the body under shock from which the acceleration and frequency of movement imparted to the body may be readily determined.

Other objects and advantages of the invention will become apparent from a study of the following description, taken in connection with the accompanying drawing in which.

Figure 1:
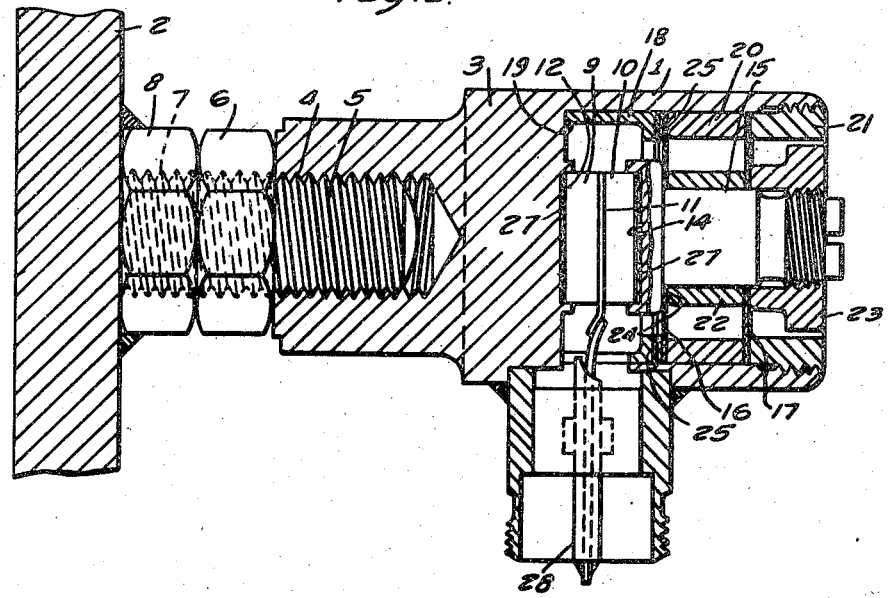
Figure 1 is a sectional view of a charge generating device constructed in accordance with the principles of this invention.

Referring to the drawing, the numeral 1 designates as a whole a device for producing a measurable impulse in response to movement of a body 2 as caused by the application thereto of a shocking force. The device 1 comprises a housing 3 adapted to be rigidly attached to the body 2 and to this end the housing 3 is provided with a threaded opening 4 for engagement with a threaded end 5 of a member 6. The member 6 preferably is formed from a single piece of material having a hexagonal middle section and threaded ends 5 and 7. The other end 7 of the member 6 is threaded into a nut 8 welded to the body 2 for the purpose of securing the housing 3 to the body 2.

A pair of quartz crystals 9 and 10 are mounted within the housing 1 for generating a charge or electrical impulse in response to movement of the casing 3 and body 2 by a shocking force applied to the body 2. The crystals 9 and 10 are cylindrical in shape and are cut with their electrical axis parallel to their cylindrical axis. A copper electrode 11 is positioned between the facing end surfaces of the crystals 9 and 10. The other end surface of the crystal 9 is adapted to seat on a surface 12 formed in the housing 3. The other end surface of the crystal 10 is adapted to seat on surface 14 provided by a member 15.

The member 15 is provided with a bias for maintaining the crystals 9 and 10 in position between the surfaces 12 and 14. To this end the member 15 is resiliently mounted within the housing 3 by annular disk springs 16 and 17. The outer edges of the springs 16 and 17 are anchored to the housing 3 by an annular element 18 adapted to seat against the housing 3 as at 19, an annular spacer element 20, and an annular adjusting member 21 having threaded engagement with the housing 3. Upon positioning the spring 16 between the members 18 and 20 and the spring 17 between the members 20 and 21 as shown, the outer ends of the springs 16 and 17 will be anchored with respect to the casing 3.

The inner ends of the springs 16 and 17 are anchored to the member 15 by an annular spacing member 22 and an internally threaded member 23 adapted to have threaded engagement with the member 15. Upon positioning the inner edge of the spring 16 between the annular surface 24 and the member 22 and the inner end of the spring 17 between the members 22 and 23, such inner edges will be anchored in position with respect to the member 15.

The anchoring parts for the springs 16 and 17 are so designed that upon assembly of the parts as shown in Fig. 1, the springs 16 and 17 will be flexed in a direction to provide a resilient bias maintaining the member 15 in engagement with the crystal 10. To adjust the deflection of the springs 16 and 17 and thus the resilient bias on the member 15, removable shims 25 are provided between the outer edges of the springs 16 and the seating member 18. If the bias is to be increased, it is merely necessary to remove one or more of the shims 25 and thereafter operate the member 21 to move the outer edges of the springs 16 and 17 inwardly with respect to the inner edges thereof, the position of the inner edges being fixed by the position of the member 15 as determined by the crystals 9 and 10.

When a body is struck a shocking force, it is subjected to large and rapidly applied accelerations and consequently vibrates at extremely high frequencies. Such vibrations and accelerations are encountered, for example, by apparatus mounted on armor-plated structure when it is struck by a projectile. The measurement of the amount of acceleration and the frequency of vibration, as made possible by the device 1, provides knowledge which is helpful in the design of apparatus to be used on an armor-plated structure such as a naval vessel which apparatus must function even though the vessel be struck by a projectile.

In order to prevent movement of the surface 14 out of engagement with the crystal 10, the bias on the member 15 must be sufficient to withstand extremely large accelerations tending to move the member 15 to the right as viewed in Fig. 1. By keeping down the mass of the member 15 and employing stiff springs 16 and 17 a bias may readily be provided for maintaining the crystals 9 and 10 in position sufficient for accelerations up to about 8,000 times gravity.

Bodies subjected to shock will vibrate at extremely high frequencies and such frequencies will be found to have a range up to 5,000 cycles per second or greater. For an indicator to have a response proportional to acceleration, its natural frequency must be greater than twice the frequency of the acceleration being measured. The natural frequency of a device is a function of its spring constant and its mass. In the case of the device 1, the spring constant is approximately the elastic stiffness of the crystals 9 and 10 in an axial direction. By maintaining the mass of the member 15 small, the natural frequency of the device 1 will be found to be very high and in the nature of from about 10,000 to about 20,000 cycles per second. By increasing the weight of the mass 15, the sensitivity of the device 1 will be increased at the expense of a decrease in the natural frequency thereof. Such increase in sensitivity accordingly lowers the frequency of vibration which the device 1 is capable of measuring. However, the increase in sensitivity is frequently desirable for measuring smaller accelerations. In this respect, it will be noted that crystals 9 and 10 function in the dual capacity of a piezo-electric generator and a mechanical spring of high stiffness.

In operation, the detector device 1 is mounted on the body subjected to the shocking force in the manner explained above. Upon a shock being applied to the body 2, the device 1 will be vibrated back and forth with the body 2 and a similar acceleration will be imparted to the casing 3 and is imparted to the body 2 by the shocking force.

If the instantaneous acceleration imparted to the housing 3 is assumed in a direction to the right as viewed in Fig. 1, a compression of the crystals 9 and 10 will be had due to the mass of the member 15 tending to remain at rest by reason of its inertia. The piezo-electric property of the crystals 9 and 10 causes a charge to be produced proportional to the force exerted by the accelerated mass thereon. The crystals 9 and 10 are so arranged that their inner facing surfaces will be of like polarity. The charge produced by the crystals 9 and 10 is taken off as an electric impulse through the terminal 28 which is electrically connected to the electrode 11. The impulse flowing through the electrode 28 is employed in a manner to be described to indicate or measure the characteristics of the motion imparted to the casing 3 by the shocked body 2.

The end surfaces of the crystals 9 and 10, together with the seating surfaces 12 and 14, are so formed that pressure applied to the crystals 9 and 10 will be distributed uniformly over the surfaces of the crystals 9 and 10. It frequently happens that adjacent surfaces will be formed with high spots which may cause a concentration of the force applied thereto in a manner likely to cause crystal breakage. Such concentration of force may likewise be caused by a particle of dirt being lodged between the surfaces 12 and 14 and the end surfaces of the crystals. In order to prevent such concentration of force due to high spots or dirt particles, a thin strip of relatively soft conducting material 27 such as tin-foil, the thickness thereof being exaggerated in the drawing for the purpose of illustration, is inserted between the crystals and their seating surfaces on the casing 3 and the member 15. The softness of the conducting material enables the high spots or deposited dirt particles to embed in the conducting material and the force is thereby distributed uniformly over the surfaces of the crystals. However, in this respect, it is necessary that the conducting material or tin-foil be thin in order that a cushioning effect which would otherwise interfere with the natural frequency will not be had.

Figure 2:
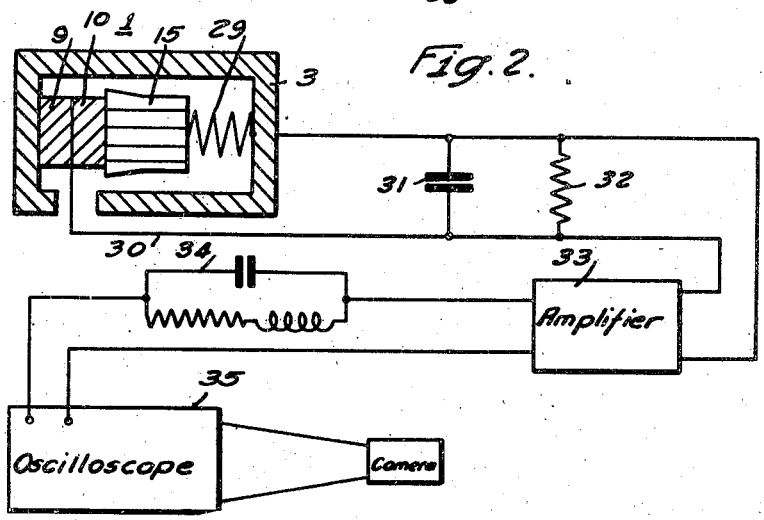
Fig. 2 is a schematic view showing the device of Fig. 1, with apparatus for measuring the extent and nature of the impulse produced by movement in response to a shocking force.

In the schematic showing of Fig. 2, the essential parts shown in Fig. 1 are indicated by like numerals. In this showing, it will be noted that the element 29 is substituted for the springs 16 and 17. The electrical impulse or charge generated by the crystals 9 and 10 is taken off through a conduit 30 which is connected to one side of a condenser 31, the other side of the condenser 31 being grounded to the casing 3. The charge which goes into the condenser 31 produces a voltage which is proportional to the force supplied to the crystals 9 and 10 and is measurable. A resistance 32 is shunted across the condenser 31 and it is necessary that this resistance be sufficiently high to allow the voltage across the condenser 31 to be proportional to the charge for the lowest frequency to be measured. The voltage across the condenser 31 is fed into an amplifier 33 of a type having a high input impedance. The output of the amplifier 33 is fed into a cathode ray type oscilloscope 35 capable of following frequencies of the type encountered. A tuned filter 34 is located in the output circuit and is tuned to correspond with the natural frequency of the device 1. By this means transient impulses due to the natural frequency vibrations of the member 15 on the elastic stiffness of the crystals 9 and 10 are suppressed.

The electron beam of the oscilloscope is thus deflected by an amount proportional to the acceleration of the casing 3. The beam is at the same time moved with a constant velocity in a direction perpendicular to the aforementioned deflection by means of a suitable sweep circuit (not shown). The trace of the beam is photographed by the camera to produce a record of the motion imparted to the casing 3. As an alternative to the use of a sweep circuit, the camera film may be moved with a constant velocity in a direction transverse to the beam deflection. From the photographic record the acceleration and the frequency of vibration imparted to the casing 3 may be readily determined.

From the foregoing, it will be apparent that the piezo-electric properties of the crystals 9 and 10, together with their mounting within the housing 3 provide a novel and efficient detector device for producing a measurable impulse from which the characteristics of the motion imparted to a body in response to the application thereto of a force of shock proportions may be determined. The device 1 has the advantage of being light in weight and small in size. It will thus be apparent that its size and weight limitations do not interfere with its attachment to the body to be studied. Moreover, the apparatus for measuring the impulse generated in response to shock may be located at a distance from the device, the impulse from the terminal 28 being transmittable by cable to such apparatus.

Figure 3:
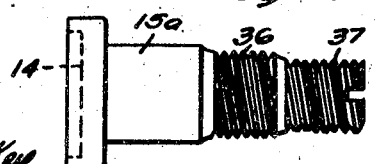
Fig. 3 is a modification for use in connection with the device shown in Fig. 1.

Referring to Fig. 3, there is shown a modified form of the member 15a for use in the device 1 to enable such device to be employed as a force meter. In this showing, the numeral 36 designates the threaded portion adapted to have engagement with the element 23 as shown in Fig. 1. The difference in the construction of the member 15a lies in the provision of the additional threaded portion 37. The portion 37 is adapted for engagement with another part of a structure (not shown) similar to the part 2. Relative movement between such parts will thus cause relative movement between the part 15a and the housing 3, the latter movement being representative of a force due to loading causing a deflection of the structure being examined. This movement will cause a compression or change in pressure on the crystals 9 and 10 and a corresponding change in the charge or electric impulse therefrom. In using the device 1 as a force meter, it will be noted that the crystals 9 and 10 are mounted between the relatively movable housing 3 and member 15a and that crystals 9 and 10 will indicate the amount of relative movement as a measure of the force applied.

Since certain changes may be made in the above described construction and different embodiments of the invention may be made without departing from the scope thereof, it is intended that all matter contained in the above description or shown in the accompanying drawing shall be interpreted as illustrative and not in a limiting sense.

I claim as my invention:

1. A device for detecting the movement of a body under a shock force comprising a housing for rigid attachment to said body, charge generating means for producing an electric impulse in response to shock comprising a piezo-electric crystal seated within said housing, a mass having a surface engageable with said crystal, resilient means for biasing said mass into engagement with said crystal and forming therewith a vibratory system of a natural frequency higher than that of the shock movements to be detected, and resilient means disposed between said mass and said housing for permitting said mass to remain substantially at rest when the device is subjected to shock.

2. A device for detecting the movement of a body under a shock force comprising a housing for rigid attachment to said body, charge generating means for producing an electric impulse in response to movement of said body comprising a pair of piezo-electrical elements arranged for opposite polarity, said housing having a surface engaging an end surface of one of said elements, a mass having a surface engaging an end surface of said other element, an electrode positioned between said elements and engaged by the other end surfaces of said elements, and means resiliently mounting said mass within said housing and providing a biasing force applied axially of said elements.

3. A device for detecting the movement of a body under a shock force comprising a housing for rigid attachment to said body, charge generating means for producing an electric impulse in response to movement of said body comprising a pair of piezo-electrical elements arranged for opposite polarity, said housing having a surface engaging an end surface of one of said elements, a mass having a surface engaging an end surface of said other element, an electrode positioned between said elements and engaged by the other end surfaces of said elements, and resilient means disposed between said mass and said housing for permitting said mass to remain substantially at rest when the device is subjected to shock so that said generating means and mass, when under shock, form a vibratory system whose elastic determinant is substantially given by the axial elasticity of said crystals.

4. A device for detecting the movement of a body under a shock force comprising a housing for rigid attachment to said body, charge generating means for producing an electric impulse in response to movement of said body comprising a pair of piezo-electrical elements arranged for opposite polarity, said housing having a surface engaging an end surface of one of said elements, a mass having a surface engaging an end surface of said other element, an electrode positioned between said elements and engaged by the other end surfaces of said elements, and means resiliently mounting said mass within said housing and providing a biasing force applied axially of said elements, said mass and said crystals forming together a vibratory system of a natural frequency higher than that of the shock movement to be detected and said resilient biasing means having a stiffness relative to said mass so as to permit said mass to remain substantially at rest when shock is applied to said housing.

WILLIAM P. WELCH.